Jan. 31, 1967      L. H. BRIXNER      3,301,791
RED LUMINESCENT COMPOSITION PRODUCT AND PROCESS
Filed April 30, 1965      3 Sheets-Sheet 3

INVENTOR
LOTHAR H. BRIXNER

BY  *Fred C. Carlson*

ATTORNEY

United States Patent Office 3,301,791
Patented Jan. 31, 1967

3,301,791
RED LUMINESCENT COMPOSITION
PRODUCT AND PROCESS
Lothar H. Brixner, Brandywine Hills, Pa., assignor to E. I.
du Pont de Nemours and Company, Wilmington, Del.,
a corporation of Delaware
Filed Apr. 30, 1965, Ser. No. 452,258
6 Claims. (Cl. 252—301.4)

This invention relates to new luminescent materials and to methods for producing them, and is more particularly directed to novel compositions of matter which are single-phase solid solutions comprising varying proportions of the constituent components $ABO_2$ and $AEuO_2$ where A is a monovalent metal of atomic number in the range 3 through 11, inclusive, and B is a trivalent rare earth element selected from the group consisting of yttrium and gadolinium. The invention is further particularly directed to processes for making these compositions by controlled heating of mixtures of the component oxides. More specifically, the novel compositions are single-phase solid solution compounds of the generic formula $AEu_xB_{1-x}O_2$ where A is a monovalent metal selected from the group consisting of lithium and sodium, B is a trivalent element selected from the group consisting of yttrium and gadolinium; and $x$ has a value of from 0.01 to 0.2. The processes for producing these compositions comprise the steps of (a) intimately mixing stoichiometric quantities of oxides of the selected metals of the generic formula; (b) firing the mixture at a temperature in the range of 800°–1000° C. for from about 10 to 14 hours; (c) subjecting the fired product to comminution and remixing; and (d) firing the comminuted product at a temperature of 1000°–1200° C. for about 10 to 14 hours.

If desired, for convenience in handling, the comminuted product of step (c) may be pelletized before the second firing step (d). Although it has been stated in step (a) above that stoichiometric quantities of oxides are mixed and used as reactants to form the products of this invention, it should be understood that other materials such as carbonates, oxalates or nitrates, which upon heating to from 800 to 1000° C. are converted to the desired oxide, are the full equivalent. The reactions which take place are illustrated by the following typical equation:

$$A_2CO_3 + xEu_2O_3 + 1 - xB_2O_3 \rightarrow 2AEu_xB_{1-x}O_2 + CO_2$$

where A is an element selected from the group Li and Na; and B is an element selected from the group Y and Gd; and $x$ has a value of 0.01 to 0.2, inclusive.

Figure 1:
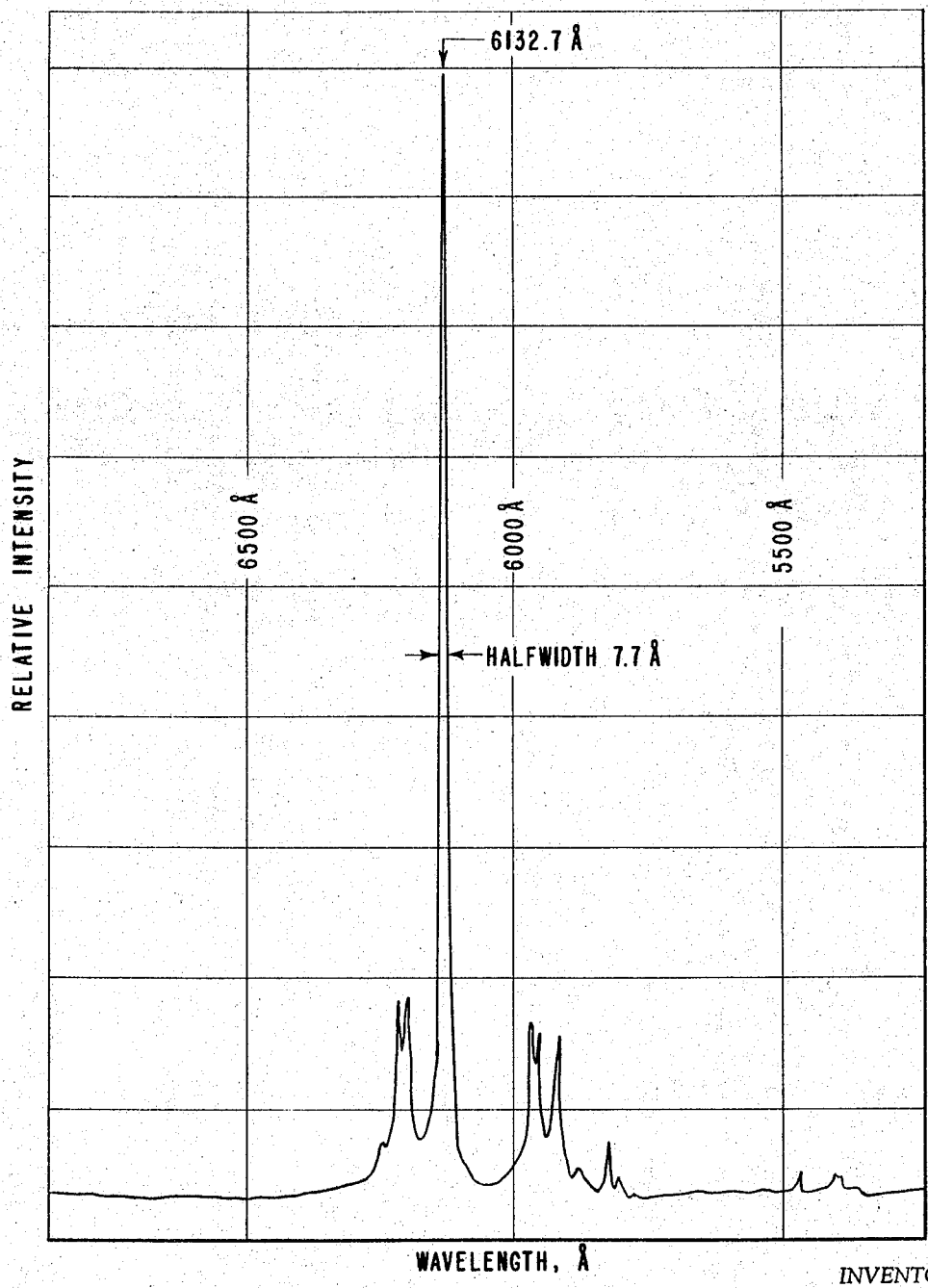
Figure 2:
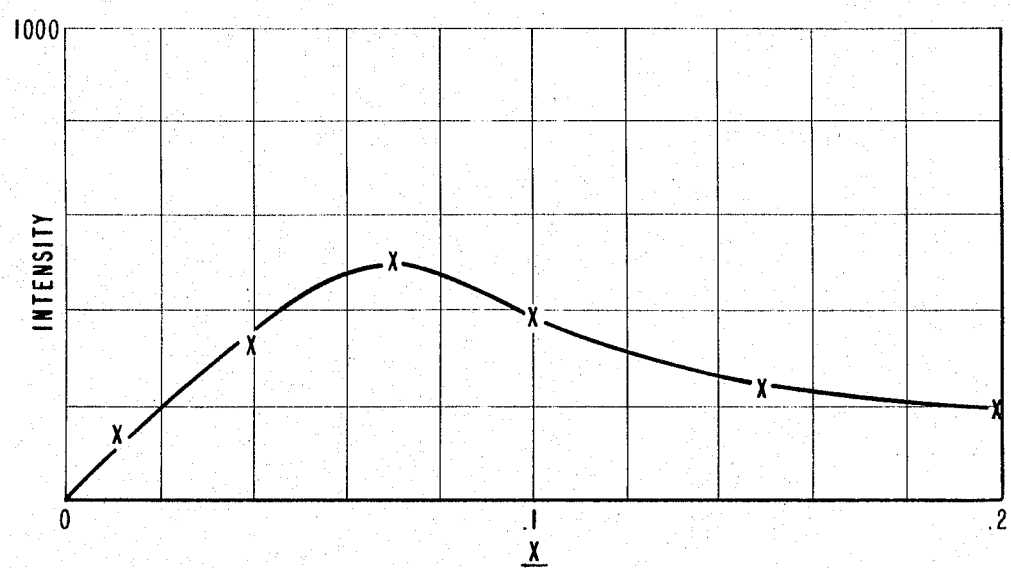
Figure 3:
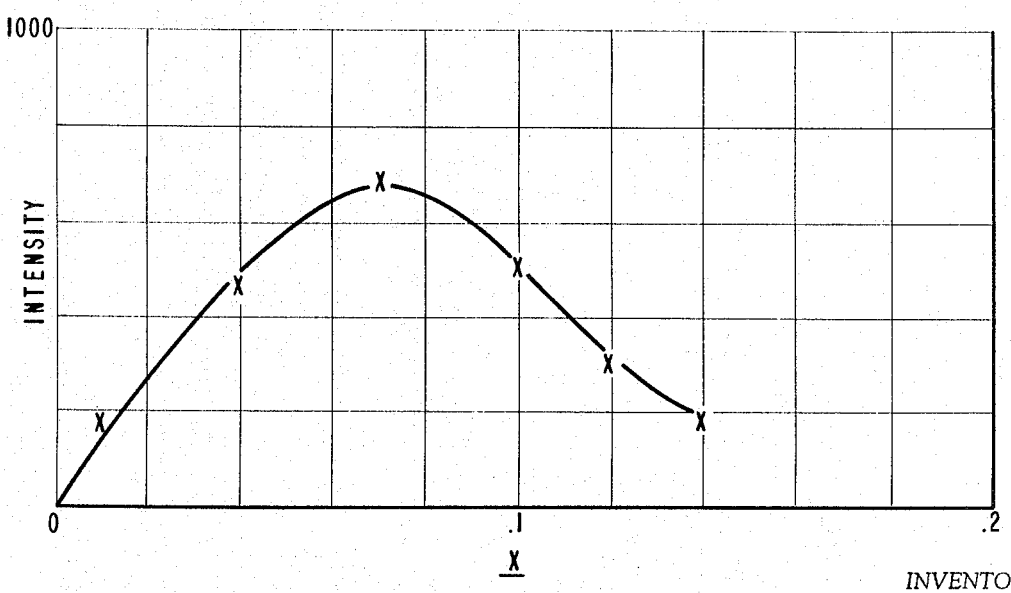
Figure 4:
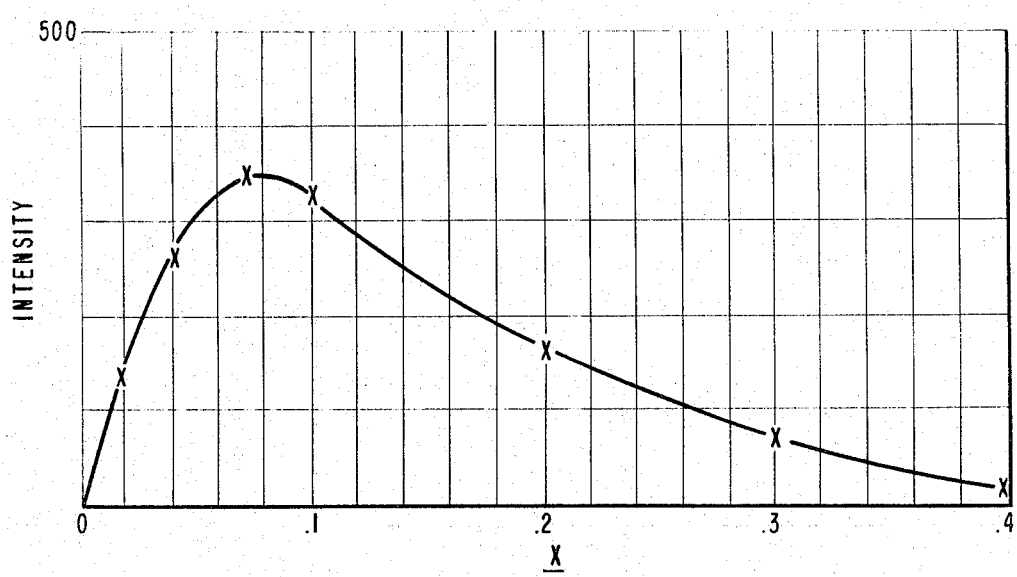
Figure 5:
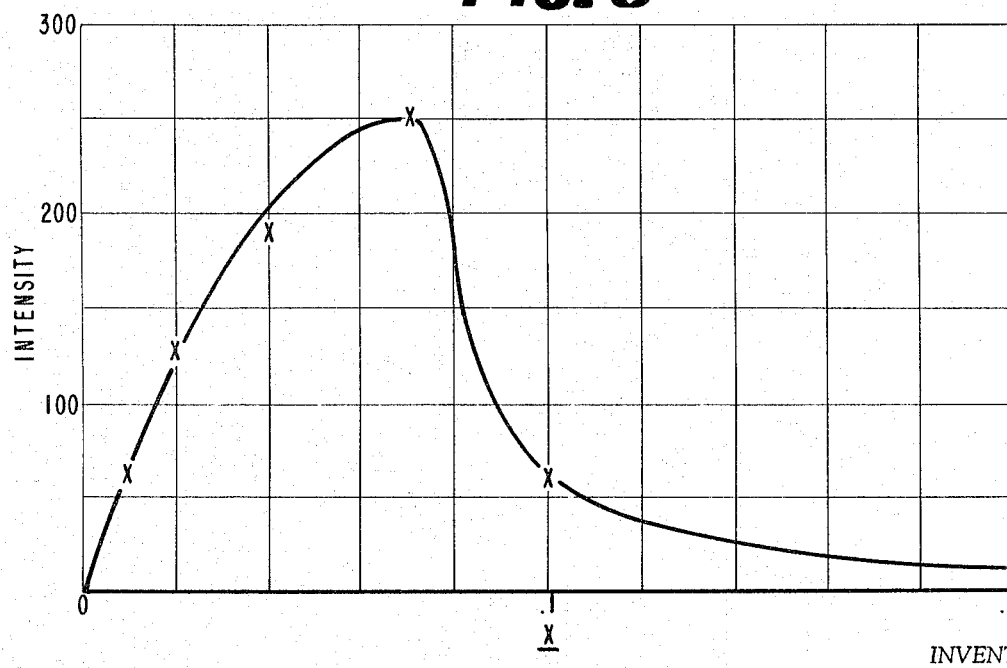

In the drawings, the fluorescent spectrum for the composition $LiEu_{0.07}Y_{0.03}O_2$ is shown in FIGURE 1. In this figure, the wave length of fluorescent emission is plotted against arbitrary intensity units to show that the most intense emission is at 6132.7 A., with a very narrow line half-width (7.7 A.), thus showing sharp emission in the red. (By "half-width" is meant the line width at half the intensity peak.) In FIGURE 2 there is shown a graph in which intensity of fluorescent emission (in arbitrary units) is plotted against values of $x$ from 0 to 0.2 for the generic formula $LiEu_xY_{1-x}O_2$. From this figure, it will be seen that a maximum in intensity of fluorescent emission is obtained when $x$ has a value of about 0.07. Therefore a preferred composition of this invention is one having the formula $LiEu_{0.07}Y_{0.93}O_2$, the preparation of which will be described in Example 7, below. FIGURES 3, 4 and 5 are graphs similar to FIGURE 2, except that they are for the systems $LiEu_xGd_{1-x}O_2$, $NaEu_xY_{1-x}O_2$, and $NaEu_xGd_{1-x}O_2$, respectively.

The compositions of this invention are useful as red phosphors and are particularly useful as red phosphors for color television screens due to their intense cathodoluminescence. They are particularly advantageous because of their extreme high efficiency and ready electron excitation. Because of their greater brightness as well as better color fidelity, the compositions of this invention have been found to be superior to the currently-used phosphors such as, for example, silver-activated zinc-cadmium sulfides, and also in comparison to what has probably heretofore been considered the best red phosphor for television screens, $Gd_{0.94}Eu_{0.06}VO_4$.

It is, therefore, an object of this invention to produce luminescent compositions of matter which will be useful for their light-emitting abilities. A further object is to prepare luminescent materials which because of their ability to emit light of good intensy over a very narrow spectral range are classed as line-emitters. Another object is to prepare luminescent materials which emit strongly in the red upon exposure to ultra-violet excitation. A still further object is to produce for use in television screens, fluorescent materials of greater brightness and better color fidelity than is exhibited by previously known television phosphors. These objects are accomplished by the herein-described novel processes and compositions.

In the processes of this invention, the component oxides were weighed to the nearest 0.1 milligram according to the stoichiometry desired in the final product. The oxides were thoroughly mixed and fired in air at a temperature in the range of 800° to 1000° C. for about 10 to 14 hours. The product of this heating was broken up, ground in an agate ball-mill under acetone, dried and, in some instances, pressed into pellets of about one inch diameter under 10–20,000 p.s.i. In a second firing step, the comminuted powder or the pellets were fired at about 1000 to 1200° C. for from 10 to 14 hours. The products of this second firing, white homogeneous crystalline materials, were examined by X-ray diffraction analyses and were found to be single-phase solid solutions having none of the original components present.

The rare earth oxides used in the preparations of this invention were of the highest purity available (>99.9%) and were obtained from Linde Chemical Division of American Potash and Chemical Company. The other chemicals used were of reagent grade quality and were obtained from Baker and Adams Chemical Company.

The following examples illustrate in detail the preparation of the novel fluorescent compositions.

Example 1

This example concerns the preparation of a phosphor of chemical composition $LiEu_{0.01}Gd_{0.99}O_2$. For the making of this product the following weights of material were used: $Gd_2O_3$, 2.0000 g.; $Eu_2O_3$, 0.0196 g.; $Li_2CO_3$, 0.4126 g.

The amounts of reactants used were stoichiometric for the preparation of $LiEu_{.01}Gd_{.99}O_2$ according to the following equation:

$$Li_2CO_3 + 0.01Eu_2O_3 + 0.99Gd_2O_3 \rightarrow 2LiGd_{0.99}Eu_{0.01}O_2 + CO_2$$

These materials were blended, then ground together under acetone in an agate ball-mill, using agate balls. The mixture was dried and fired at 900° C. for 14 hours. The product of this firing was cooled, broken up and reground in acetone in the agate mill, then again dried. The powder product was then compressed into pellets about one inch in diameter and refired at 1100° C. for 14 hours.

At the conclusion of this firing step, the product was found by X-ray diffraction analysis to be a single-phase solid solution with none of the original components detectable. The fluorescent emission of the product was studied and is included as a part of the data given in FIGURE 3.

*Examples 2 through 23*

By the method of Example 1, additional compositions of the generic formula $LiEu_xGd_{1-x}O_2$ were prepared using stoichiometric quantities of reactants as listed in Table I.

TABLE I.—$LiEu_xGd_{1-x}O_2$ SYSTEM

| Example | Value for $x$ | Grams $Eu_2O_3$ | Grams $Gd_2O_3$ | Grams $Li_2CO_3$ |
|---|---|---|---|---|
| 2 | 0.04 | 0.0810 | 2.0000 | 0.4254 |
| 3 | 0.07 | 0.1464 | 2.0000 | 0.4392 |
| 4 | 0.1 | 0.2162 | 2.0000 | 0.4538 |

In a similar manner the equivalent yttrium compositions were prepared and are summarized in Table II.

TABLE II.—$LiEu_xY_{1-x}O_2$ SYSTEM

| Example | Value for $x$ | Grams $Eu_2O_3$ | Grams $Y_2O_3$ | Grams $Li_2CO_3$ |
|---|---|---|---|---|
| 5 | 0.01 | 0.0315 | 2.0000 | 0.6610 |
| 6 | 0.04 | 0.1299 | 2.0000 | 0.6816 |
| 7 | 0.070 | 0.2346 | 2.0000 | 0.7036 |
| 8 | 0.10 | 0.3464 | 2.0000 | 0.7270 |
| 9 | 0.20 | 0.5844 | 1.5000 | 0.6133 |
| 10 | 0.30 | 0.6680 | 1.0000 | 0.4674 |

In the same manner, compositions comprising sodium, gadolinium and yttrium were prepared and are summarized in Tables III and IV.

TABLE III.—$NaEu_xGd_{1-x}O_2$ SYSTEM

| Example | Value for $x$ | Grams $Eu_2O_3$ | Grams $Gd_2O_3$ | Grams $Na_2CO_3$ |
|---|---|---|---|---|
| 11 | 0.01 | 0.0196 | 2.0000 | 0.5918 |
| 12 | 0.04 | 0.0810 | 2.0000 | 0.6104 |
| 13 | 0.07 | 0.1464 | 2.0000 | 0.6300 |
| 14 | 0.1 | 0.1946 | 2.0000 | 0.6510 |
| 15 | 0.2 | 0.4864 | 2.0000 | 0.7320 |
| 16 | 0.3 | 0.8339 | 2.0000 | 0.8370 |
| 17 | 0.4 | 1.2972 | 2.0000 | 0.9766 |

TABLE IV.—$NaEu_xY_{1-x}O_2$ SYSTEM

| Example | Value for $x$ | Grams $Eu_2O_3$ | Grams $Y_2O_3$ | Grams $Na_2CO_3$ |
|---|---|---|---|---|
| 18 | 0.02 | 0.0636 | 2.0000 | 0.9578 |
| 19 | 0.04 | 0.1299 | 2.0000 | 0.9778 |
| 20 | 0.07 | 0.2346 | 2.0000 | 1.0094 |
| 21 | 0.2 | 0.7792 | 2.0000 | 1.1734 |
| 22 | 0.3 | 0.6680 | 1.0000 | 0.6705 |
| 23 | 0.4 | 1.0391 | 1.0000 | 0.7823 |

Each of these products was analyzed by X-ray diffraction analysis and was found to contain none of the original reactants as such.

The fluorescent emission of each of the compositions listed in Tables III and IV was tested and is incorporated in the data shown in FIGURES 4 and 5.

A comparison was made between the results in fluorescence obtained by excitation of the product of Example 7 and of $Gd_{0.94}Eu_{0.06}VO_4$, probably the best previously known red television phosphor. Under electron excitation with a beam of 10 $\mu$A. accelerated by 10 kv., (conditions closely resembling those in a color television tube), the bright red signal for the product of Example 7 was 380 mv. while that for the commercial vanadate was 180 mv.

In the preparation of the luminescent compositions of this invention it has been found that, although lithium is preferred as the alkali metal constituent, sodium may be substituted for lithium without significant effect on the luminescent properties of the product. The rare earth element which is used in $x$ amount in conjunction with a $1-x$ quantity of europium in the compositions of this invention is chosen from the group consisting of yttrium and gadolinium. These rare earth elements are useful as host elements, a portion of which is being substituted by europium, because they possess in common the following two characteristics: (1) they have no intrinsic color, and therefore offer no interference with the clean red emission of the product phosphor, and (2) they themselves do not emit in the visible spectrum upon ultra-violet excitation, and, therefore, again offer no interference with the red emission of the product phosphor.

I claim:

1. In a process for the production of red luminescent compositions of the generic formula $AB_{1-x}Eu_xO_2$ where A is a monovalent metal having an atomic number in the range of 3 through 11, inclusive, and B is an element selected from the group consisting of yttrium and gadolinium, and $x$ has a value of from 0.01 to 0.2, inclusive, the steps comprising (a) intimately mixing in stoichiometric amounts, at least one compound of each of the metals of the generic formula, said compounds being selected from the group consisting of the oxides of said metals and compounds which upon heating at 800 to 1000° C. form said oxides, (b) firing the mixture at a temperature of from 800° to 1000° C. for a period of from 10 to 14 hours; (c) subjecting the fired product to comminution and remixing; and (d) firing said comminuted materials at a temperature of 1000 to 1200° C. for from 10 to 14 hours.

2. A single-phase, solid-solution, red luminescent composition of formula $AB_{1-x}Eu_xO_2$ where A is a monovalent metal of atomic number in the range of 3 through 11, inclusive, and B is an element selected from the group consisting of yttrium and gadolinium; and $x$ has a value of 0.01 to 0.2, inclusive.

3. A single-phase, solid-solution, red luminescent composition of claim 2 in which A is sodium, B is gadolinium and $x$ has a value of 0.07.

4. A single-phase, solid-solution, red luminescent composition of claim 2 in which A is lithium, B is gadolinium, and $x$ has a value of 0.07.

5. A single-phase, solid-solution, red luminescent composition of claim 2 in which A is lithium, B is yttrium and $x$ has a value of 0.07.

6. A single-phase, solid-solution, red luminescent composition of claim 2 in which A is soduim, B is yttrium and $x$ has a value of 0.07.

No references cited.

CARL D. QUARFORTH, *Primary Examiner.*

S. J. LECHERT, JR., *Assistant Examiner.*